Jan. 11, 1949.     T. REA     2,458,918

SUN VISOR

Filed June 5, 1947

INVENTOR.
Thomas Rea
BY *Louis Chayka*
ATTORNEY

Patented Jan. 11, 1949

2,458,918

UNITED STATES PATENT OFFICE 2,458,918

SUN VISOR

Thomas Rea, Detroit, Mich.

Application June 5, 1947, Serial No. 752,789

1 Claim. (Cl. 296—95)

My improvement pertains to a sun shade or a visor for use above the windshield of an automobile, the visor being mounted so that it may be retracted when not needed.

The purpose of my invention is to provide a visor of simple construction, devoid of conventional side arms, braces, or struts which are customarily employed to support the same. A further object of my improvement is to provide a combination of elements including the automobile body and the windshield whereby the outer rim of the visor fits into a horizontally disposed recess in said automobile body so as not to mar in any way the stream-lined appearance of the respective part of the vehicle.

I shall now describe my improvements with reference to the accompanying drawings in which.

Similar numerals refer to similar parts throughout the several views.

Figure 1:
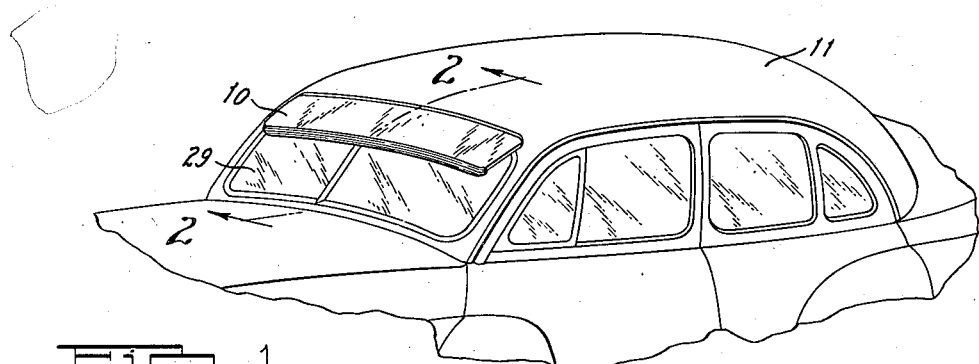
Figure 1 is a perspective view, in fragment, of the front part of an automobile, the view including a perspective view of my visor in its outside position.
Figure 2:
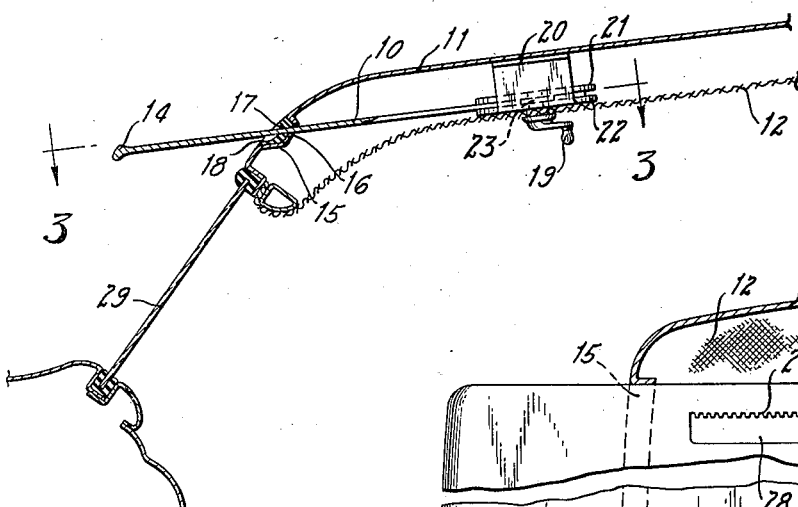
Figure 2 is a sectional view on line 2—2 of Figure 1.
Figure 4:
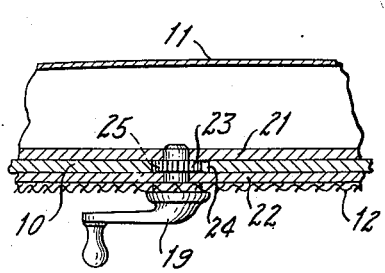
Figure 4 is a sectional view on line 4—4 of Figure 3.

The visor, generally indicated by numeral 10, is disposed in the upper portion of the automobile body under the roof 11, extending substantially parallel to the surface of the roof but being disposed between the top member thereof, made customarily of metal, and the textile underlayer 12. Having the form of a thin plate preferably made of sheet metal, the visor is provided with parallel sides, but has the front border line curved to conform to the curvature of the automobile body at that level as indicated by numeral 13. A bead 14, disposed along said outer edge of the visor adds rigidity to said plate and serves another purpose to which reference will be made presently.

The main body of the visor is disposed within the automobile body under the roof, which curves downwardly at the front where it is provided with a horizontal slot 16 in a horizontally disposed recess 15. It is through this slot that the visor may be propelled outwardly or withdrawn, as the case may be. A strip 17 of resilient rubber cemented within the recess above the visor, and a similar strip 18, cemented within the recess below the visor, serve as a seal, preventing entry of air or moisture along the surfaces of the visitor into the body of the automobile.

Figure 3:
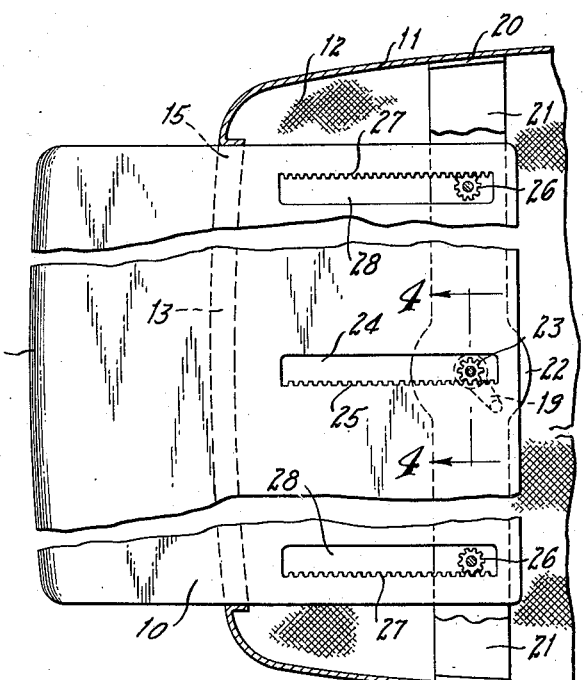
Figure 3 is a sectional view on line 3—3 of Figure 2.

The visor is operated from within the automobile by means of a rack and pinion mechanism shown in Figure 3. The mechanism includes a hand crank 19 in a supporting bracket 20 affixed to the under surface of roof 11. The bracket is made of two flat plates or bands, 21 and 22, made of metal and disposed parallel in a spaced relation to each other, the space being intended to provide room therebetween for the body of the visor 10.

A pinion 23, driven by the crank, is located within a slot 24 within the body of the visor and is enmeshed with a rack 25, said rack forming one side of the slot. Pinion 26, mounted on said bracket 20, in mesh with racks 27 within slots 28 in the body of the visor, along the sides thereof, and parallel to slots 24, keep the body of the visor from being swung to one side or another during its movement outwardly or inwardly with respect to the automobile body.

To conclude the description of the pertinent elements herein, I wish to add that numerals 28 and 29 indicate the windshield of the automobile, above which windshield said visor is located.

Normally, the body of the visor is withdrawn into its place under the roof of the automobile, only the bead 14 showing on the outside, where it fits into the horizontal recess 15. When it is desired to have the visor project outwardly over the windshield 29, this is done by turning the crank 19, causing the pinion 23 in mesh with rack 25 to propel the body of the visor forwardly with respect to the body of the automobile. The visor may be retracted by turning the crank in the opposite direction.

Having described my improvement, what I wish to claim is a visor of the particular construction disclosed by me. Specifically, what I wish to claim is as follows:

In combination with an automobile body, including a windshield and a horizontal slot in a recess above said windshield, both the slot and the recess being substantially co-extensive in length with that of the windshield, a visor slideably mounted under the roof of said automobile body and having its front portion disposed within said slot, the visor being provided in the midsection thereof with a slot extending in the direction of the longitudinal axis of the automobile body and a similar slot parallel to the first named slot, in each side of the visor, a side of each slot being cut to form a rack, a pinion meshed into each rack, and crank means to rotate the pinion in the slot in the mid-portion of the visor to propel the visor outwardly or to retract it rearwardly, and a bead along the outer edge of the visor to fit into said recess when the visor is in its retracted position.

THOMAS REA.

REFERENCES CITED

The following references are of record in the file of this patent:

UNITED STATES PATENTS

| Number | Name | Date |
|---|---|---|
| 1,845,577 | Berliawsky | Feb. 16, 1932 |
| 1,989,592 | Ghazal | Jan. 29, 1935 |